United States Patent [19]

Neidl et al.

[11] 4,072,559

[45] Feb. 7, 1978

[54] METHOD AND APPARATUS FOR THE ZONE-WISE SHUFFLING OF NUCLEAR REACTOR FUEL ELEMENTS

[75] Inventors: Herbert Neidl; Günther Kaspar; Rolf Drossel, all of Erlangen, Germany

[73] Assignee: Siemens Aktiengesellschaft, Munich, Germany

[21] Appl. No.: 635,379

[22] Filed: Nov. 25, 1975

Related U.S. Application Data

[63] Continuation of Ser. No. 416,684, Nov. 16, 1973, abandoned.

[30] Foreign Application Priority Data

Nov. 30, 1972 Germany .............................. 2258722

[51] Int. Cl.² .............................................. G21C 17/06
[52] U.S. Cl. ................................. 176/19 LD; 176/30
[58] Field of Search ............ 176/19 R, 19 LD, 30–32; 73/40.7; 250/303, 364, 380, 383

[56] References Cited

U.S. PATENT DOCUMENTS

| | | | |
|---|---|---|---|
| 3,073,767 | 1/1963 | Whitham et al. | 176/19 LD |
| 3,142,625 | 7/1964 | Wellborn | 176/19 R |
| 3,375,169 | 3/1968 | McHugh et al. | 176/19 R |
| 3,376,200 | 4/1968 | Ward | 176/19 R |
| 3,416,996 | 12/1968 | Burton et al. | 176/30 |
| 3,419,467 | 12/1968 | Holzer et al. | 176/19 |
| 3,733,250 | 5/1973 | Van Santen et al. | 176/30 |
| 3,762,993 | 10/1973 | Jones | 176/19 LD |
| 3,786,257 | 1/1974 | Weiss et al. | 176/19 LD |
| 3,801,441 | 4/1974 | Jones | 176/19 R |
| 3,855,058 | 12/1974 | Groos et al. | 176/30 |

FOREIGN PATENT DOCUMENTS 923,633 4/1963 United Kingdom .................. 176/30

*Primary Examiner*—Verlin R. Pendegrass
*Assistant Examiner*—S. A. Cangialosi
*Attorney, Agent, or Firm*—Kenyon & Kenyon, Reilly, Carr & Chapin

[57] ABSTRACT

For zone-wise shuffling of the fuel elements of a nuclear reactor core, single ones of the elements, one after another, are removed sequentially, and immediately upon the removal of each element it is tested for cladding defects, and if free therefrom, immediately inserted back in its new position in the reactor core, elements having cladding defects being eliminated. An apparatus for the rapid testing of each removed element is provided by a testing chamber containing water in which the removed element is immersed and allowed to remain for a short time, the water then being removed and tested for gamma activity to determine the element's cladding integrity. Other features are disclosed.

4 Claims, 3 Drawing Figures

METHOD AND APPARATUS FOR THE ZONE-WISE SHUFFLING OF NUCLEAR REACTOR FUEL ELEMENTS

This is a continuation, of application Ser. No. 416,684, filed Nov. 16, 1973, now abandoned.

BACKGROUND OF THE INVENTION

A typical nuclear reactor installation, particularly of the pressurized-water coolant type, includes a reactor vessel containing an exposible core of fuel elements and positioned in a pit beside which there is a fuel element pit for fuel element decay or storage. The pits intercommunicate via a lock through which the elements can pass. Both pits are water flooded when the reactor's core of fuel elements is exposed so that the fuel elements may be removed and carried to the fuel element pit which contains a fuel element storage rack in which all of the fuel elements of the reactor's core can be retained with a physical arrangement preventing a condition of criticality. Normally, this fuel element pit is water flooded at all times.

After a reactor has been operating for what are normally fixed periods of operation, the fuel elements are burned-up or spent to different degrees. The fuel elements located in the central zone of the reactor wall are exposed to the strongest neutron flux and burn-up first and, therefore, are normally removed from the reactor core first and eliminated from the installation such as by being transported to a reprocessing facility. This means that replacement elements are required for the rector core's central zone.

For replacement elements those which surround the central zone are removed from their previously operating positions and inserted or shuffled into this central zone, providing these elements have claddings free from defects. By this zone-wise shuffling technique where the outer elements are shuffled to the central zone of the reactor core, the reactor is maintained in continuous operation excepting for the time required for the shuffling.

The prior art shuffling method, particularly in the case of pressurized-water coolant reactors, has consisted in removing all of the fuel elements from the reactor core and depositing them in the fuel element storage rack in the fuel element storage pit, these operations being conducted under water and by the usual remotely controlled element manipulating devices. Then each fuel element is removed from the rack and tested for cladding defects and returned to the rack, after which all of the fuel elements free from cladding defects are returned to the reactor pit for insertion in the reactor core in the position to which they should be shuffled. In other words, excepting for the burned-up central zone elements, the elements in the surrounding zone which are to be shuffled, are treated as a group of elements, the entire group being transferred to the storage rack, tested one after the other, sorted as required for the shuffling and returned in the form of a group to the reactor in the adjoining pit. All of this time the reactor installation must be in a shut-down condition and out of power production. This is an undesirably long time which in the case of a medium-sized plant, as exemplified by the fact that in the nuclear power plant at Obrigheim, some four to five days must be set aside for this zone-wise shuffling practice. This kind of a shuffling has been proposed in the German Patent No. 1,248,822.

Such prolonged shut-downs required for this prior art shuffling practice involves prolonged stoppage of power production and, therefore, very substantial financial losses for any nuclear power plant, and there has existed for some time an urgent need to shorten this time required for shuffling the core's fuel elements.

SUMMARY OF THE INVENTION

A substantial shortening of the time required for such shuffling is the object of the present invention.

To attain this object, the invention provides an entirely new method for zone-wise shuffling the fuel elements of the reactor core, and an improvement on the prior art nuclear reactor installation which provides, in effect, apparatus for most effectively practicing this new method.

This new method comprises sequentially removing single ones of the elements one after another, as contrasted with all at once, and immediately upon its removal testing each removed element for possible cladding defects, and if free therefrom, immediately inserting the tested element back in the core but shuffled to its new position, elements found to have cladding defects being, of course, eliminated. Because each element is removed singly, its underwater handling by the usual fuel element manipulating devices can be effected rapidly, without confusion and with greater safety. The elements can be removed one at a time, carried to the fuel element storage pit, tested there and be immediately returned in each instance to its new position, the as yet untested elements previously in use remaining in the core until for each its time for testing and return or discard arrives.

Also, to provide for maximum testing speed, by this new method each singly previously used fuel element from the outer reactor zone is immersed in water for a time period causing heating and gamma contamination of this water if the element's cladding is defective, this body of water, kept stationary around the element for the testing time, is then tested for gamma activity which may be done rapidly by presently available equipment. The time period during which the element is in the body of water need not and should not exceed 20 minutes in the case of currently used elements operating with a pressurized-water coolant.

The improvement of the nuclear reactor installation, forming the apparatus phase of the present invention, comprises positioning one or two chambers in the fuel element storage pit which communicates via the lock with the reactor vessel pit, each chamber being vertical and adapted to contain a single fuel element insertable through its open top. During the fuel element shuffling, the single fuel elements are carried one at a time and inserted in the chamber, the latter containing the flood water of the one pit. An air bell is provided for the top of this chamber and is supplied with compressed air to maintain the water in the chamber stationary and free from flow or from communicating with the flood water surrounding the chamber. After the short dwell time, such as twenty minutes, the body of water confined by this test chamber and in which the fuel element under test has been immersed, is removed from the test chamber and returned to the flood water in the fuel element pit via a gamma activity measuring tank connected in the wagter return line and which is provided with a gamma radiation measuring apparatus such as is commercially available and gives an extremely rapid readout.

If the activity measured indicates a cladding defect, the just-tested element is eliminated from the shuffling procedure; otherwise, the tested element found to be in good condition is immediately returned to the reactor core where it is inserted in the new position to which it should be shuffled.

Two of these fuel element testing chambers may be provided in the fuel element storage pit so that during the necessary dwell time of one element in the chamber, a succeeding element may be removed from the core and transported into the fuel element storage pit and immersed in the water in this second chamber, such a two-cycle operation increasing the testing speed. In this instance, two of the outer zone elements may be removed from the core but this is done one at a time so that confusion is avoided and the time required to transport a single element from the core through the communication between the pits and into the test chamber and then back to the core, is not slowed in any way.

Each test chamber has an open top, and to assure that the body of water in the chamber and in which the element is immersed remains as a dead or unflowing body of water, this open top is provided with the air bell which is lowered over the open top and supplied with compressed air to form an air cushion at the top of the test chamber, holding the water stationary around the element under test. This bell is vented and removed after the dwell time and the water is drawn off from the test chamber and then returned to the flood water in the fuel element pit via the gamma activity measuring tank. In the normal installation of the fuel element pit water has a forced circulation, being pumped through a circulating line, and this flow-through action line may be used to power a jet pump interposed in this line and having a section inlet connected to suck the test water from the fuel element test chamber and introduce it into the flow in this circulation pipe for return to the flood water in the pit. The air bell may be handled by the customary remote control mechanisms.

DETAILED DESCRIPTION OF THE INVENTION

To exemplify the invention, the pressurized-water coolant type of nuclear reactor installation is used, but the invention may be applicable to other types such as gas-coolant nuclear reactors.

Figure 1:
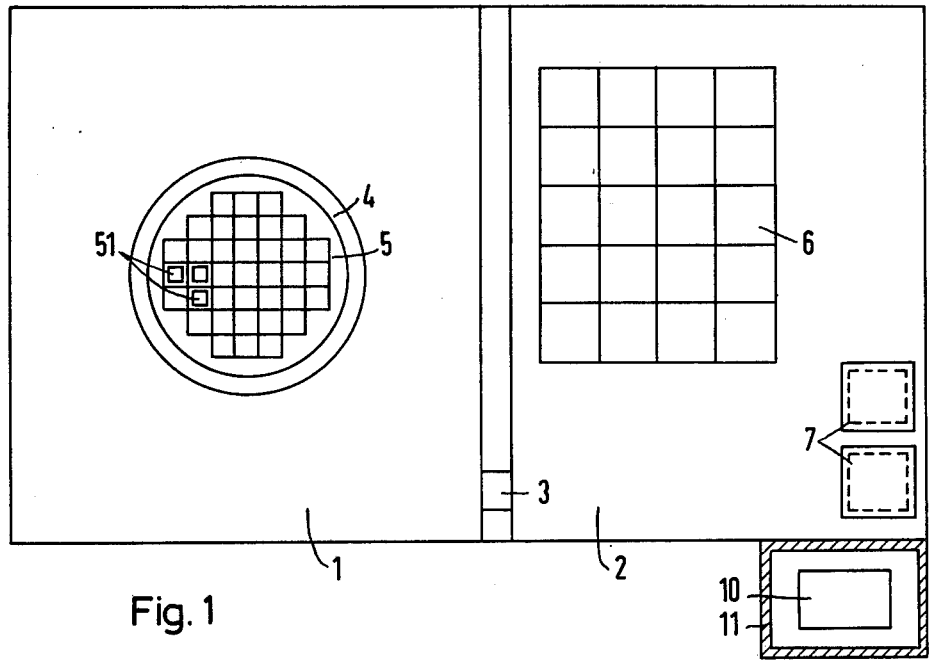
FIG. 1 is a plan view of a pressurized-water coolant nuclear reactor installation embodying the invention.
Figure 2:
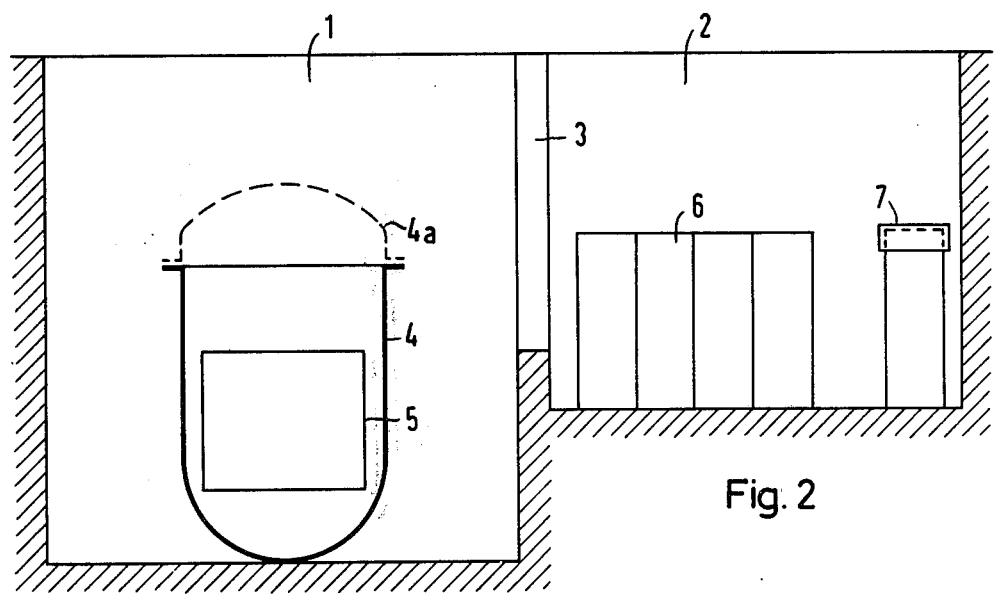
FIG. 2 is a vertical section of FIG. 1.

Referring first to FIGS. 1 and 2, the reactor pit is shown at 1, the fuel element storage pit at 2 and the communication lock between the pits is indicated at 3. The reactor pit contains the reactor pressure vessel 4 in which the reactor core 5, composed of the individually removable fuel elements 51, is exposable by removing the vessel's cover 4a. Although not illustrated in detail, the fuel element lock 3 and both the pits 1 and 2 are water flooded when the cover 4a is removed, and during the handling of the fuel elements, these being removed from the core and carried through the lock 3, heretofore as a group, to the fuel element storage rack 6 in the pit 2. Although not shown, the usual fuel element handling equipment is used to remove, transport and store the fuel elements, all being under water. The rack 6 has room to accept all of the fuel elements of the charge in the core 5, and provides a physical arrangement of the elements avoiding a condition of criticality with certainty.

According to the present invention, the fuel element storage pit 2 contains the two test chambers 7 to provide for maximum testing speed, but only one of these chambers is a necessity. These test chambers have previously been referred to and they and the testing apparatus are described in detail hereinafter. The other details of the nuclear reactor installation need not be described in detail since several have already been built in the manner indicated by the drawings. The various parts illustrated by FIGS. 1 and 2 are reasonably accurately scaled with respect to the actual installations.

A typical fuel element may have a length in the area of 4 meters and it may be of square cross section with each side being about 20 cm wide. Other shapes and dimensions may be used.

According to the present invention, after the removal and elimination of the burned-up fuel elements which were operating in the central portion of the core, the remaining fuel elements one-at-a-time can be removed by means of the usual handling equipment and carried under water through the lock 3 and inserted in one of the test chamber 7 where, as previously indicated, it is immersed in the still body of water for a dwell time of approximately 20 minutes, this body of water then being removed, its gamma activity level is measured, and depending upon this measurement, the test fuel element is either immediately returned to the reactor pit and installed in its new position to which it is to be shuffled, or eliminated, as for instance by being inserted in the storage rack, for subsequent removal and possible processing. To further speed the shuffling, during the dwell time that this first element is in the test chamber 7, a succeeding fuel element may be removed from the core, transported as was the first, and inserted in the other one of the test chambers 7, by which time the first removed element is ready for removal from the test chamber, having completed its dwell time. In this manner the single element testing cycles can overlap to provide the maximum speed of shuffling.

Figure 3:
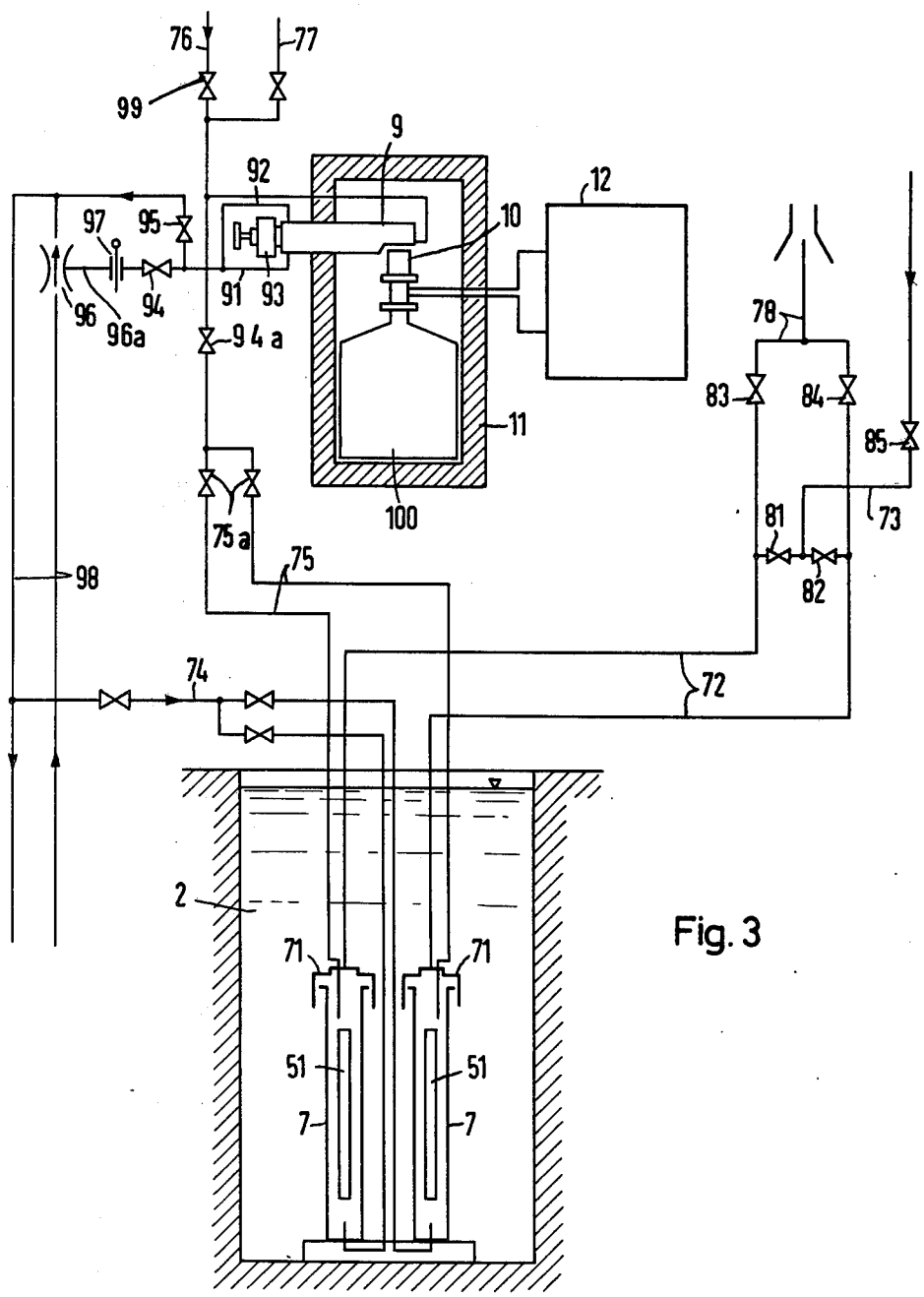
FIG. 3 is a diagrmmatic showing of the fuel element testing arrangement.

Referring now to FIG. 3, which diagrammatically shows the test facility for practicing the described method:

The fuel element storage pit 2, shown here in FIG. 3 out of scale, contains the open-topped test chambers 7 side-by-side and vertically arranged, although more could be provided. Each is shown as containing one of the fuel elements 51 from the core 5. Each test chamber 7 is provided with an air bell cover 71 which can be removed and replaced by any of the remote control devices available for this purpose.

The bottom of each vertical test chamber 7 is connected with the fuel element storage pit water via the storage pit water circulating line 98 and the individually valved lines 74, so that new water can flow in immediately after the test chamber water is removed following each test. The air bells form air cushions above the water in the test chambers holding the bodies of water stationary during the dwell times and during these times the valve lines 74 are shut off. The body of water surrounding each element must be kept stationary during the test period.

As soon as a test element is placed in one of the chambers and the air cushion is formed above it, the element heats up the water. The air bells 71 are supplied with compressed air via the valve 85, line 73, and selectively, by the valves 81 and 82, opening of these valves establishing the air cushion. The decay heat of the fuel element 51 in the testing body of water heats the latter up and in the case of a cladding defect radioactive fission products emerge into the water. This heating up testing time period is about 20 minutes. At the end of this time the air cushion, possibly now containing radioactive gases, such as Xenon and Krypton, is lead off through the line 72, the valves 81 and 82 now being closed, and the valves 83 and 84 which were closed while the air was sent to the bells 71 selectively, are opened so that via 78 these gases are vented into the gas collecting facility available in any nuclear reactor installation and which is, therefore, not shown by FIG. 3.

Thereafter the water is sucked or drawn off from the test chamber by means of the water jet pump 96 powered by the pressure flow of pit water in the usual circulating lines 98, this jet pump having a suction inlet 96a. The test body of water in each instance is sucked off from the test chamber by this inlet 96a upon opening the valve 94 connecting with each chamber via the pipe line system 75, selection valves 75a, line 91 and via a gamma activity measuring tank 9 interposed between the lines 75 and 91. The jet pump 96 creates an adequate suction because it is interposed in the fuel element storage tank fluid water circulating system provided with a pump (not shown) which under the pump pressure maintains the fuel storage pit water in continuous circulation, the lock forming the communication 3 separating this water from the pit 1.

The measuring tank 9 is provided with a gamma activity detector 10 which may be a germanium (Li) detector, this tank 9 and detector 10 being enclosed by a lead shield 11 to prevent ambient radiation from falsifying the measuring results obtained. The measuring can be performed while the volume of the test water from the chamber 7 flows through the tank 9, although by the use of the various valves the flow can be stopped for this measuring if desired. The method of carrying out such measurements is known and is, for example, described by the German Offenlegungsschrift 2,037,796. The cryostat 100 for cooling the detector 10 with liquid nitrogen is also located within the lead shield 11.

Outside this shield 11 an amplifier and analyzer and evaluating equipment, generally indicated at 12, permits the operating personnel to read immediately and without any time delay whether or not the measured fuel element under test is defective or in condition to be returned to the core for installation in its shuffled position.

In the design of the measuring tank 9 it is necessary to make every possible protection to assure that no radioactive corrosion products are deposited which can thereafter falsify subsequent measuring. For this purpose, the inside wall of this measuring tank is polished as smoothly as possible, and furthermore, cleaning devices, for instance, in the form of a rotative brush (not shown) working against the inside of the tank 9 may be provided. Only the brush operator 93 is shown. In this way the inside of the chamber 9 can be decontaminated if necessary after each test. The top of the line tank 9 may connect with the suction inlet 96a of the jet pump 96 via a line 92 for the purpose of suctioning off any air cushion which may inadvertently be formed in the top of the tank 9 by liberated dissolved gases. Also, the measuring tank 9 is shown as being provided with a deionate supply line 76 having a valve 99, the deionate, under a pressure of six atmospheres, for example, flowing through the tank 9 and back to the pit water via the valve 95, the valves 94 and 94a being closed. The valved line 77 is indicated for use to vent the entire system.

As previously mentioned, a time of twenty minutes serves for the heating-up time in the test chamber 7. The actual measurement itself obtained by the detector 10 requires a time of about 100 to 200 seconds. The result of the measurement can immediately be read out at the evaluating equipment 12. Such equipment is commerically available and may include an analog display providing a curve form of the results. As soon as the peaks of such a curve for certain radioisotopes, such as iodine 131, caesium 134 and caesium 137 exceed a predetermined height, it is possible to conclude with certainty that the fuel element is defective. The results of such measurement can, with the help of such equipment, be printed out, which takes only about 50 seconds in addition.

What is claimed is:

1. A water-cooled reactor installation comprising a reactor pit containing a pressure vessel containing an exposable core of individually removable vertically elongated clad fuel elements, a fuel element storage pit beside said reactor pit and adapted to be water-flooded to a level above said fuel elements when the elements are removed from said core and stored vertically in the storage pit, a fuel element lock interconnecting said pits, a circulating line containing a circulating flow of water, said line circulating water through said storage pit at least up to said level, at least one elongated test chamber vertically positioned in said storage pit and having an open top below said level through which one of said fuel elements can be removably inserted, said test chamber being dimensioned to closely confine any single one of the fuel elements at a time, said test chamber being connected with said circulating flow of water and thereby containing a portion of said water in the form of testing water, a removable air bell closing said open top when said test chamber contains one of said fuel elements and said testing water, controllable means for supplying said air bell with compressed air to form an air cushion holding said testing water stationary in said test chamber for a dwell time causing the water to acquire gamma activity if one of said fuel elements in the test chamber has a cladding defect, means for removing said testing water in the form of a continuous flow of testing water from said test chamber after said dwell time, means for testing said continuous flow of removed testing water for gamma activity and means for returning a thereby tested flow of testing water back to said circulating line.

2. The installation of claim 1 in which means are provided for venting gases from said air cushion prior to removing said testing water from said test chamber, and for disposing of said vented gases separate from said testing water.

3. The installation of claim 1 in which said means for removing said testing water from said test chamber is a jet pump sucking from said test chamber and powered by said circulating flow of water in said circulating line.

4. The installation of claim 1 in which said means for testing said removed flow of testing water comprises a chamber through which said flow passes and fills, and a radiation detector positioned to read-out from contents of said chamber.

* * * * *